(12) United States Patent
Verzeletti

(10) Patent No.: US 6,649,862 B2
(45) Date of Patent: Nov. 18, 2003

(54) MACHINE FOR CUTTING PIPES WITH DIFFERENT CROSS-SECTIONS AND DIAMETERS BY MEANS OF A LASER BEAM

(75) Inventor: Mauro Verzeletti, Sulzano (IT)

(73) Assignee: Tube Tech Machinery S.r.L., Brescia (IT)

(*) Notice: Subject to any disclaimer, the term of this patent is extended or adjusted under 35 U.S.C. 154(b) by 0 days.

(21) Appl. No.: 10/192,872

(22) Filed: Jul. 10, 2002

(65) Prior Publication Data

US 2003/0015506 A1 Jan. 23, 2003

(30) Foreign Application Priority Data

Jul. 17, 2001 (IT) .................. BS2001A000058
Jan. 22, 2002 (IT) .................. BS2002A000004

(51) Int. Cl.[7] ............................................. B23K 26/00
(52) U.S. Cl. ................................................ 219/121.67
(58) Field of Search ................. 219/121.67, 121.78, 219/121.79, 121.82, 121.72

(56) References Cited

U.S. PATENT DOCUMENTS 4,675,499 A * 6/1987 Nakai .................. 219/121.78
5,864,113 A * 1/1999 Cossi .................. 219/121.67

* cited by examiner

*Primary Examiner*—Tom Dunn
*Assistant Examiner*—Jonathan Johnson
(74) *Attorney, Agent, or Firm*—McGlew and Tuttle, P.C.

(57) ABSTRACT

This invention concerns a machine for cutting pipes of different cross-section and diameter by means of a laser beam, comprising a laser source (26) and a system of mirrors for directing the laser beam from said source to a cutting head (7) for focalizing said beam on a pipe to be cut through a relevant mirror (Sp5, Sp7'). The cutting head is fitted rotating on an arm (3, 34) hinged on a bearing ring (5, 33) said bearing ring being on board a carriage (4, 32) sliding on a system of guide rails that can move parallel to the pipe to be cut.

14 Claims, 9 Drawing Sheets

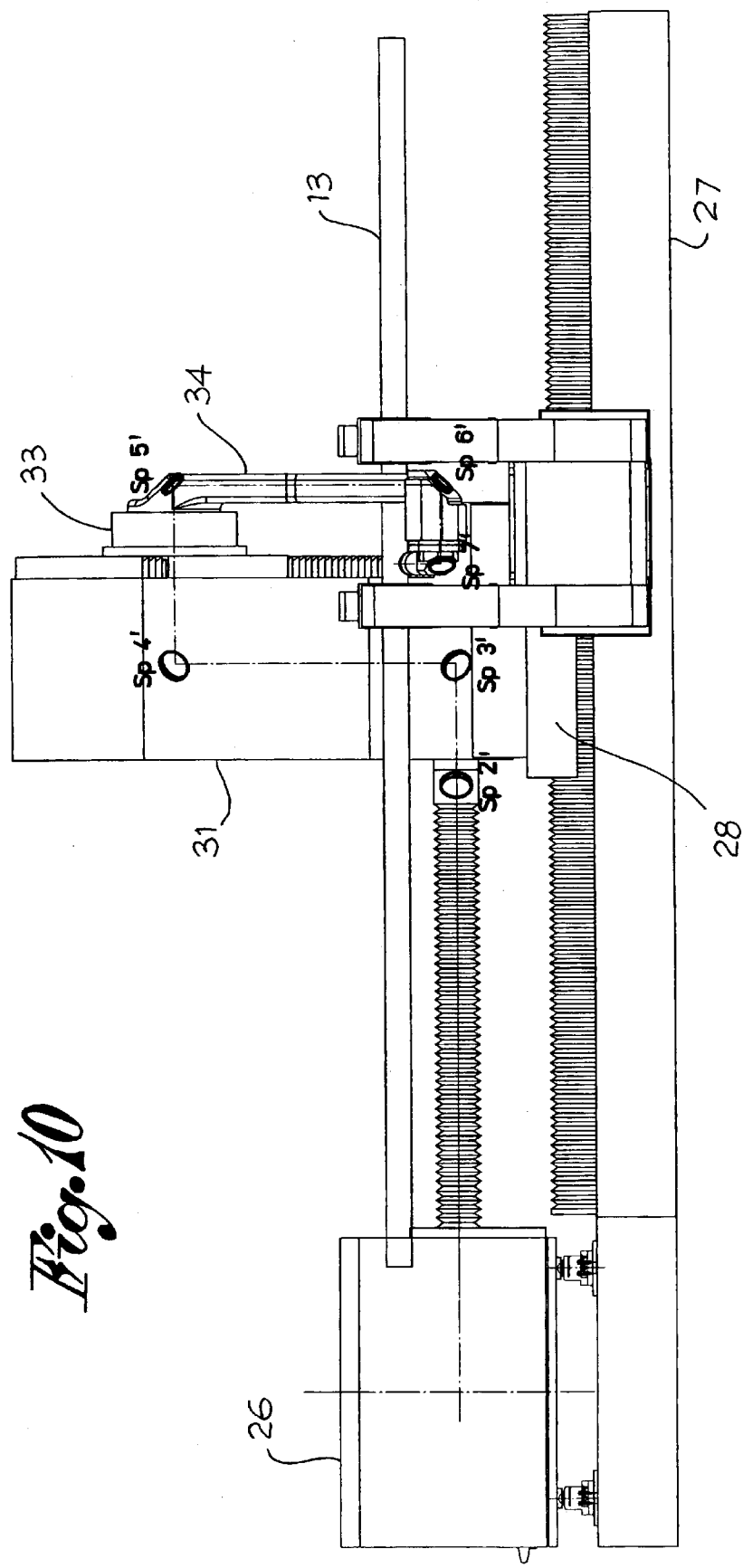

MACHINE FOR CUTTING PIPES WITH DIFFERENT CROSS-SECTIONS AND DIAMETERS BY MEANS OF A LASER BEAM

This invention concerns the pipe machining industry and, in particular, pipe cutting, and refers in particular, but not only, to machines for cutting continuously manufactured pipes to be cut in specific lengths during pipe feed.

STATE OF THE ART

Standard procedures for manufacturing pipes or cylindrical bodies in general envisage both the so-called "continuous productions", and the production of pipes in sections, including those made from suitably bent and welded plate metal.

With respect to the cutting operations, these can be performed using special blade or cutting disk equipment, or using a more modern method, by using laser beams.

Within the framework of this latter solution, for instance in patent EP 0 808 685 A2, laser cutting units have already been presented for pipes made in continuous, substantially comprising a laser source, a sliding carriage, driven by a motor on rails placed parallel to the direction of feed of the pipe to be cut and, on such carriage, a devices for securing the carriage to the pipe and two or more hollow arms turning on parallel tables and perpendicular to the direction of pipe feed, said arms featuring mirrors at one or both ends to suitably reflect and direct the beam exiting from the laser emitter towards a focalisation head rotating around the pipe. The laser source can be mounted on-board the carriage or be fixed, placed alongside the pipe former so as to project the laser beam parallel to the pipe being formed.

Such cutting units nonetheless can only be used with round-section pipes because the movement of the focalisation head is designed to follow a constant trajectory with circular movement around the pipe. This requirement derives from the fact that the laser beam must always be directed at right angles on the surface to be cut and on which it is projected to obtain a precise and already finished cut, this method of operation not therefore being applicable to pipes with other than round cross section.

Further limitations of traditional laser cutting devices are the impossibility of working pipes of different diameter, including to an extensive degree.

PURPOSE AND SUBJECT OF THE INVENTION

The purpose of this invention is to eliminate the problems and limitations referred to above by adopting a machine for cutting pipes by means of a laser beam in conformity with claim 1.

More details of the invention will be clearer by referring to the attached approximate and not restrictive drawing in which:

FIG. 1 schematically shows the machine in question as a whole in a first form of realisation;

Figure 6:
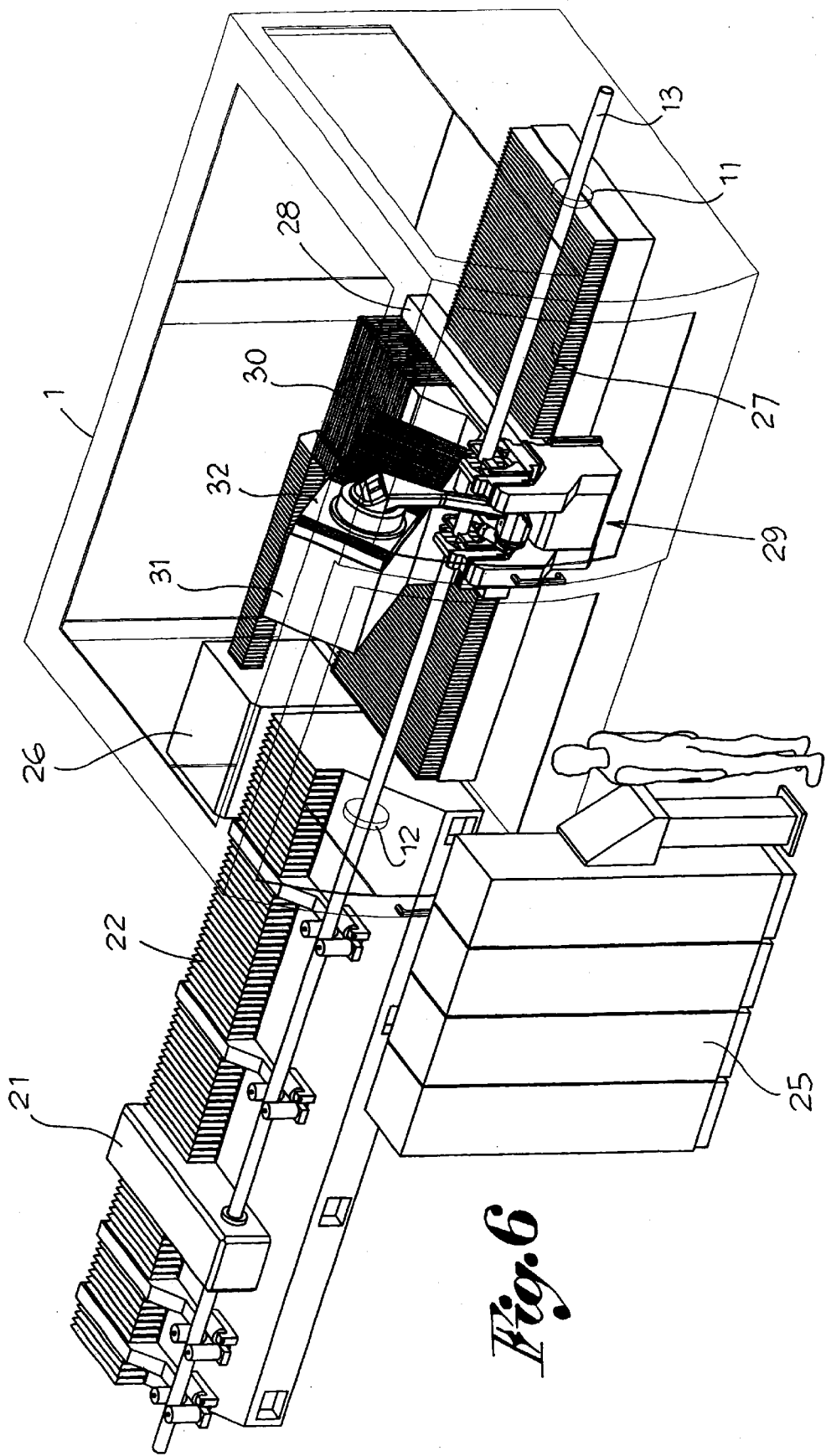
Figure 7:
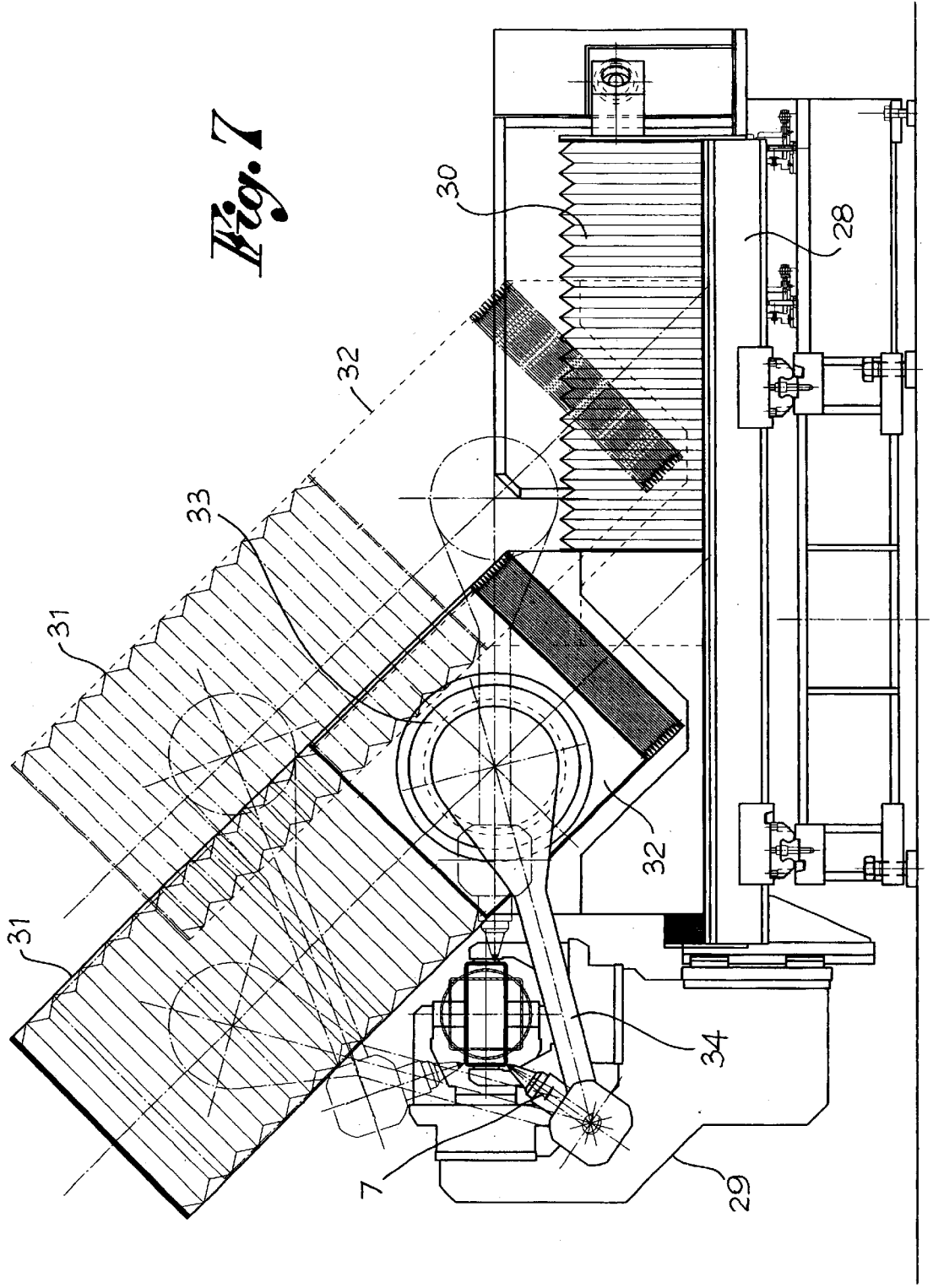
Figure 8:
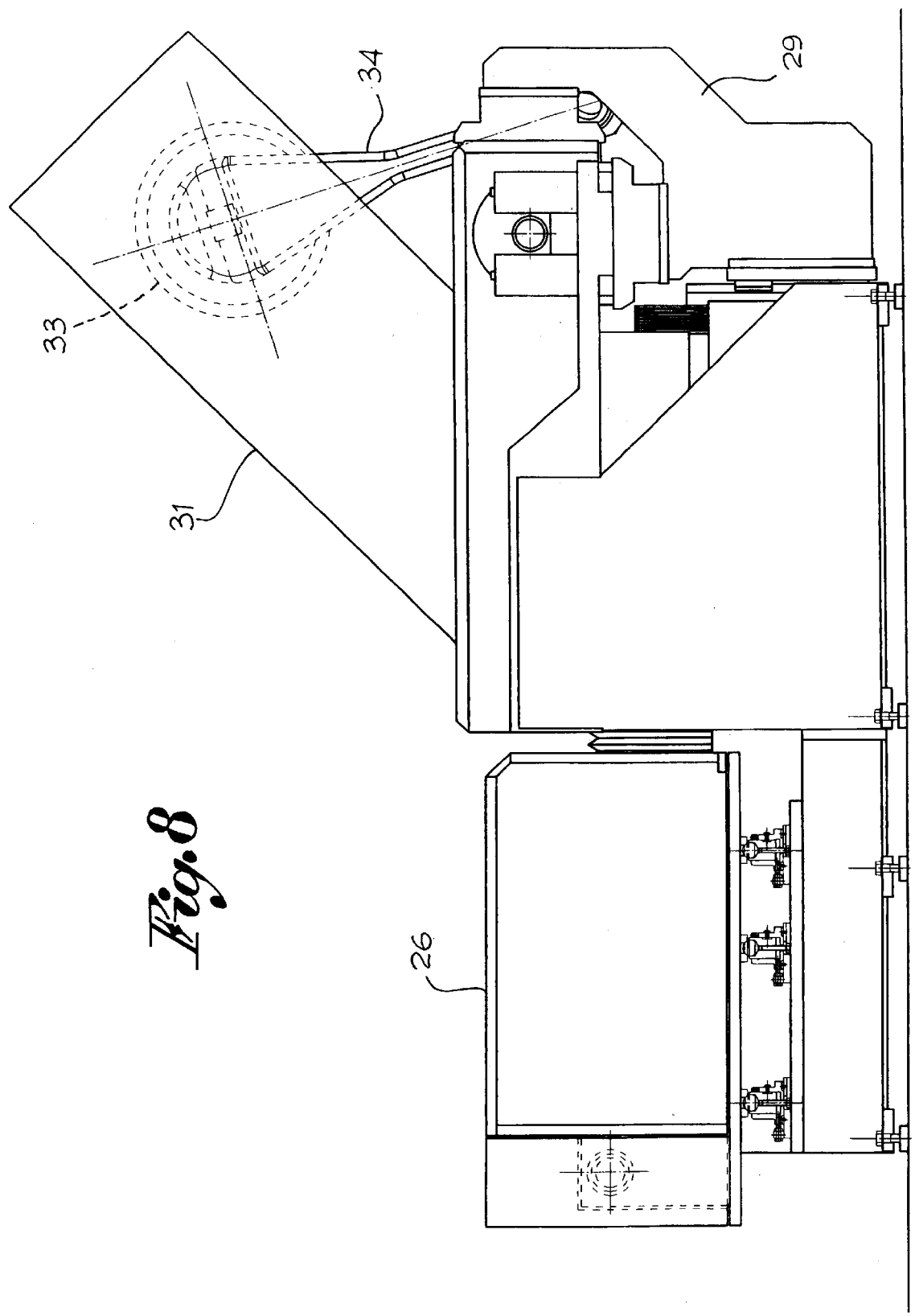
Figure 9:
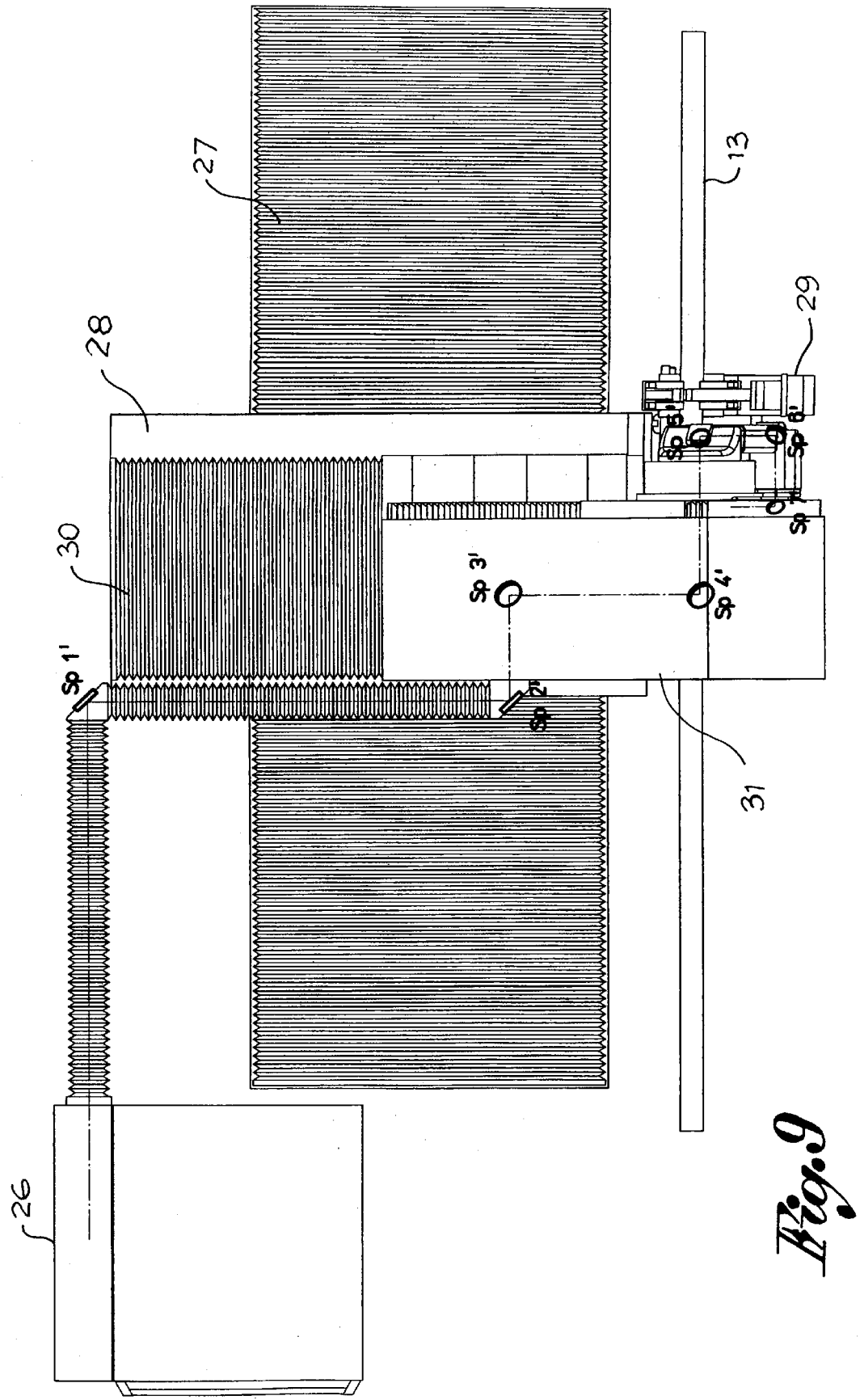

FIG. 6 schematically shows the machine in question as a whole in a second form of realisation;

FIG. 7 shows the machine as in FIG. 6 seen from the front;

FIG. 8 shows the machine from the rear;

FIG. 9 represents a view from above of the layout of the laser beam reflection mirrors; and FIG. 10 represents the layout of the mirrors in front view;

With reference to FIGS. 1–5 showing the machine in a first form of realisation, by 1 is globally indicated a frame or cab inside which is the laser cutting unit indicated as a whole by 2.

Figure 1:
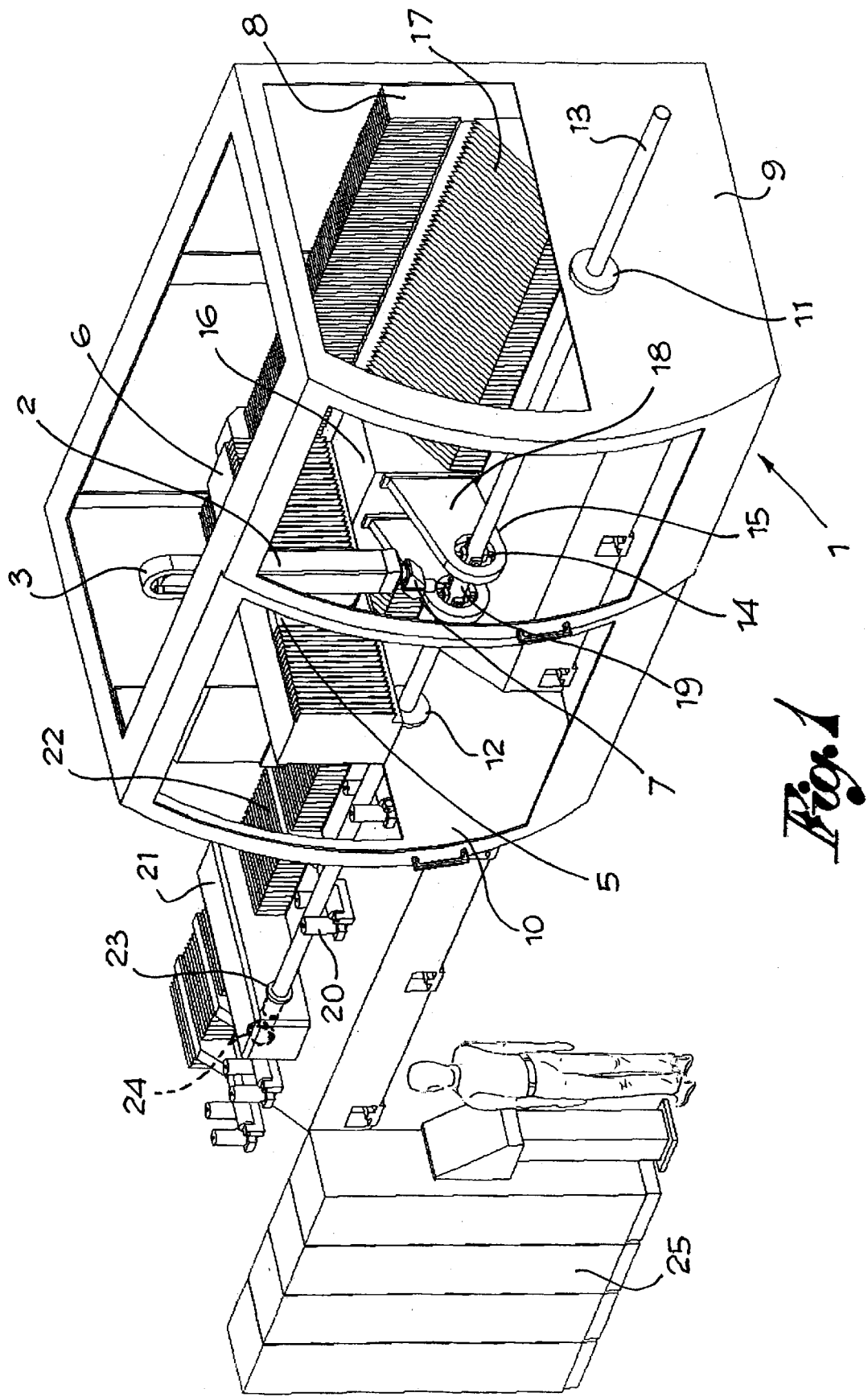

More in detail, the laser cutting unit—FIG. 1—consists of an arm 3 suitably hinged on a bearing ring 4, said bearing ring being positioned on a carriage 5 susceptible to movement on a guide rail 6.

To arm 3, which is telescopic and operated by means of suitable actuating means (not shown), a head 7 is suitably connected which represents the means for focalising the laser beam.

Rail 6 can also be transferred onto another rail 8 at right angles to the first. The cab or frame 1 feature, on their respective walls 9 and 10, two openings 11 and 12 through which to pass pipe 13 coming from a production line (not shown).

Said pipe 13, entering cab 1, is intercepted and guided by at least a pair of radial grippers 14 featuring at least four jaws two of which servo-controlled and two idle acting as striker for the pipe, said grippers being suitably housed on a frame 15 located on a carriage 16 susceptible to movement in a direction parallel to the direction of pipe 13 on a rail 17.

More in detail, the frame 15 consists of a pair of parallel plates 18 defining a space 19 inside which the laser beam focaliser 7 operates.

As previously indicated, the arm 3 is telescopic and suitably driven by actuator means controlled, like all the other parts of the machine, by an electronic unit 25.

Figure 2:
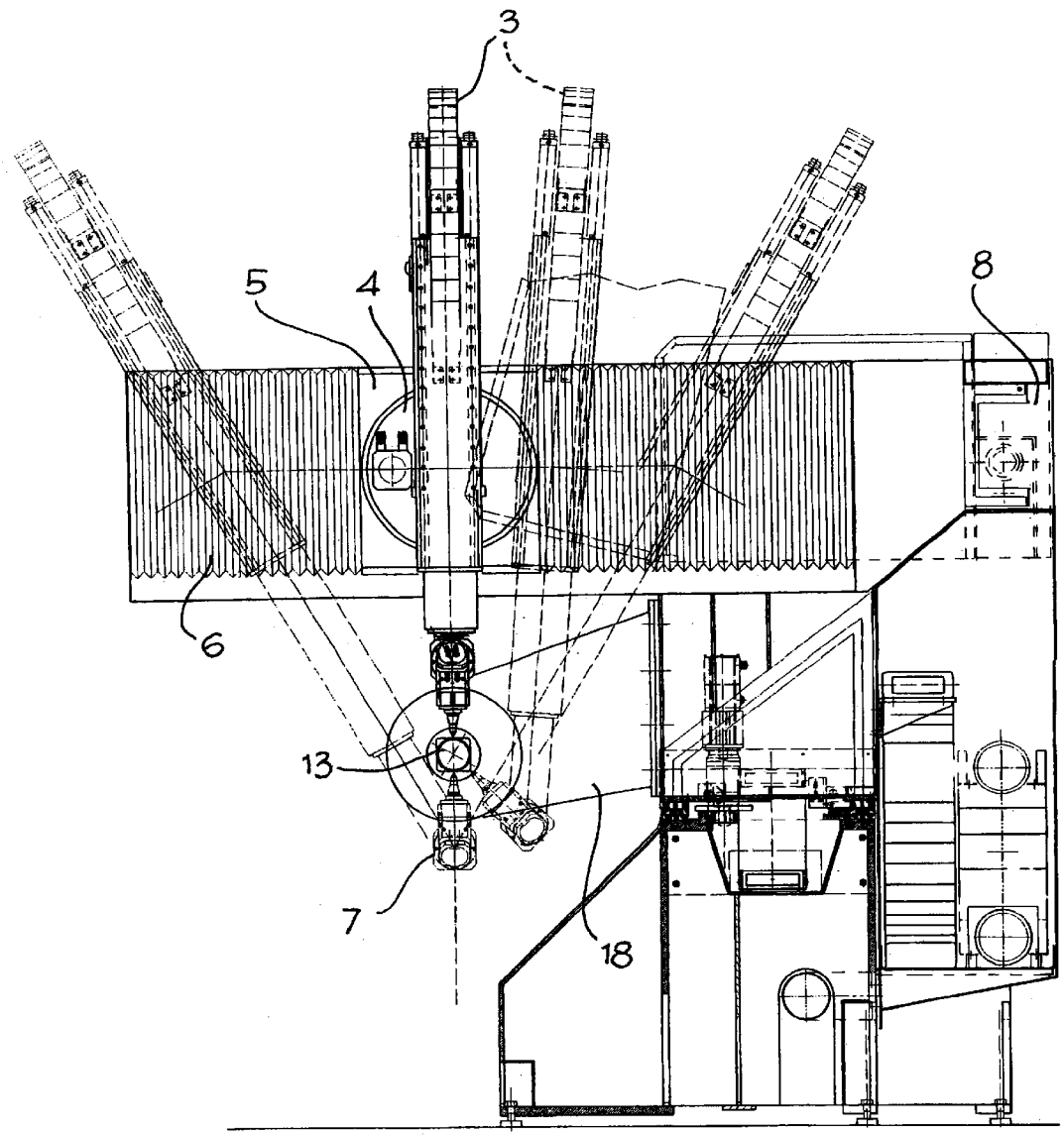
FIG. 2 shows the machine and the cutting unit as in FIG. 1 seen from the front.
Figure 3:
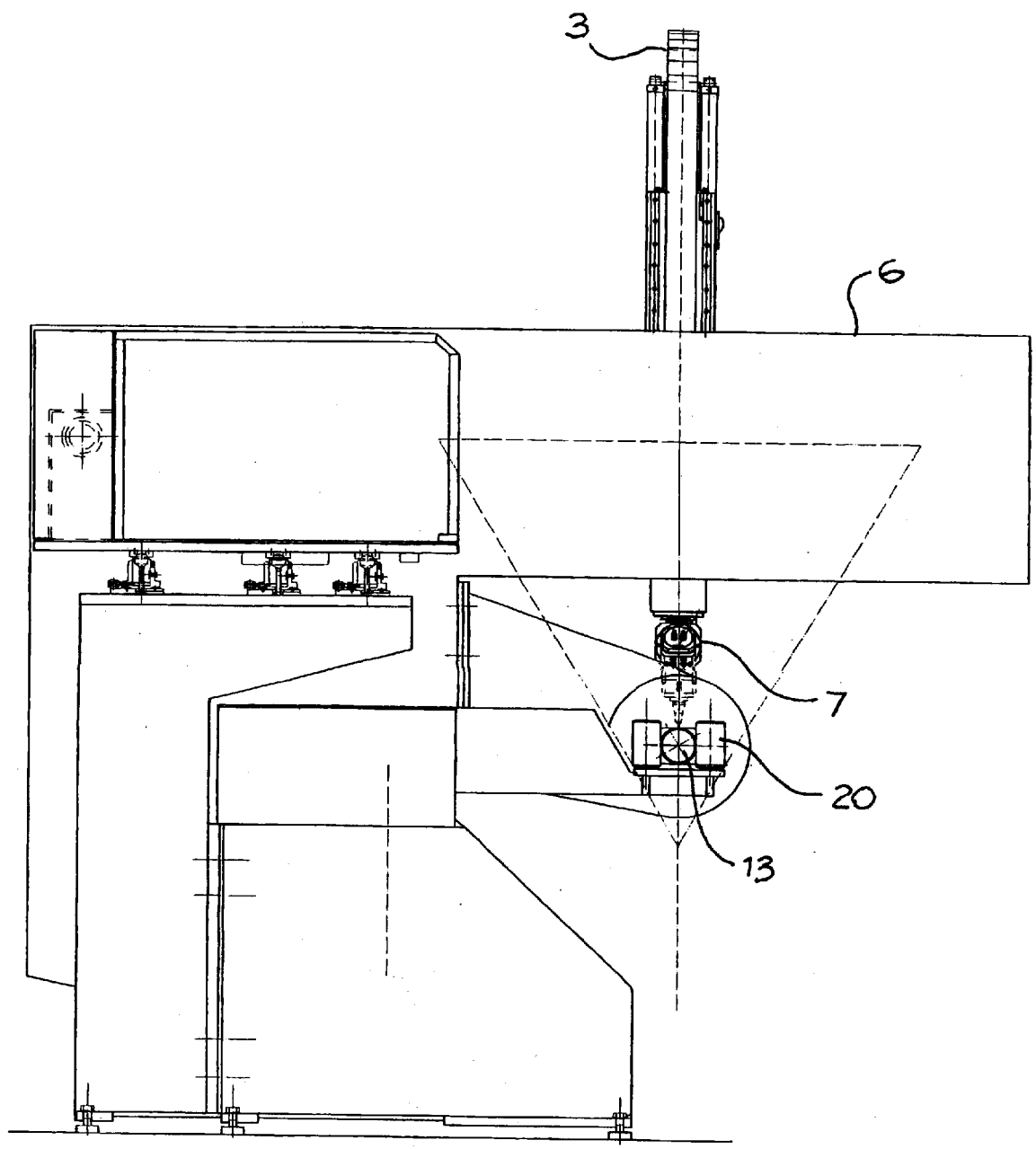
FIG. 3 shows the machine and cutting unit from the rear.
Figure 5:
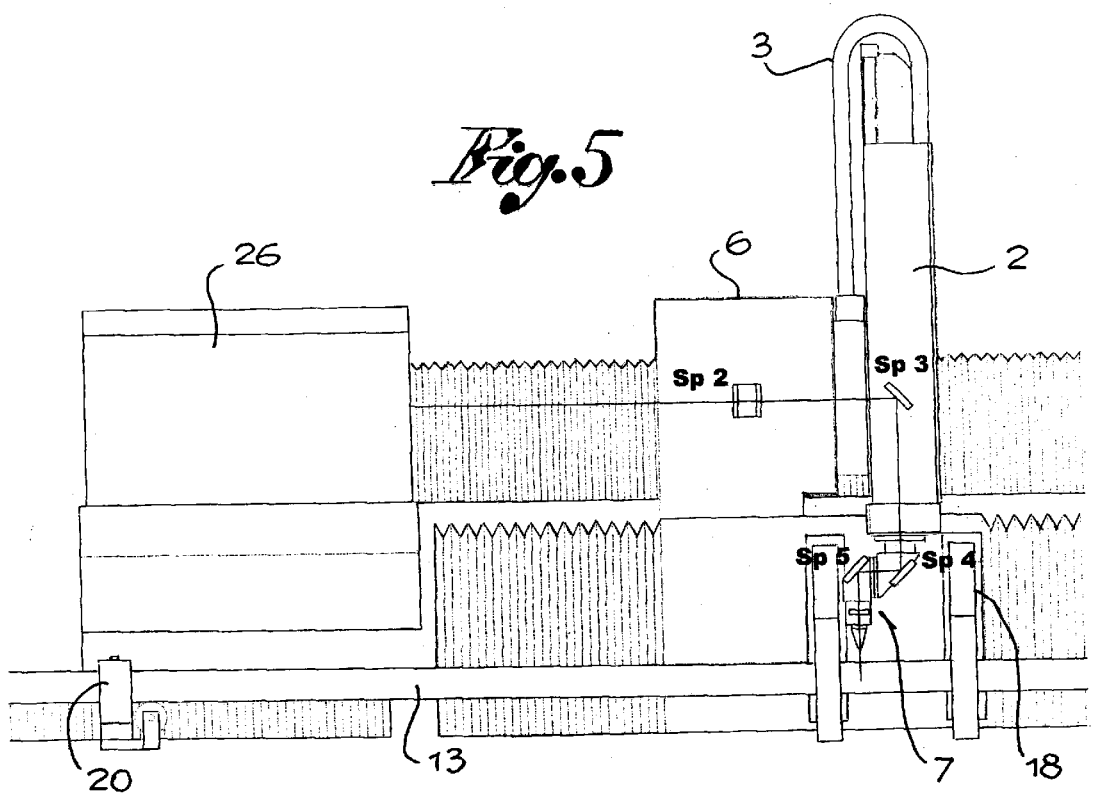
FIG. 5 represents the layout of the mirrors in front view.
Figure 4:
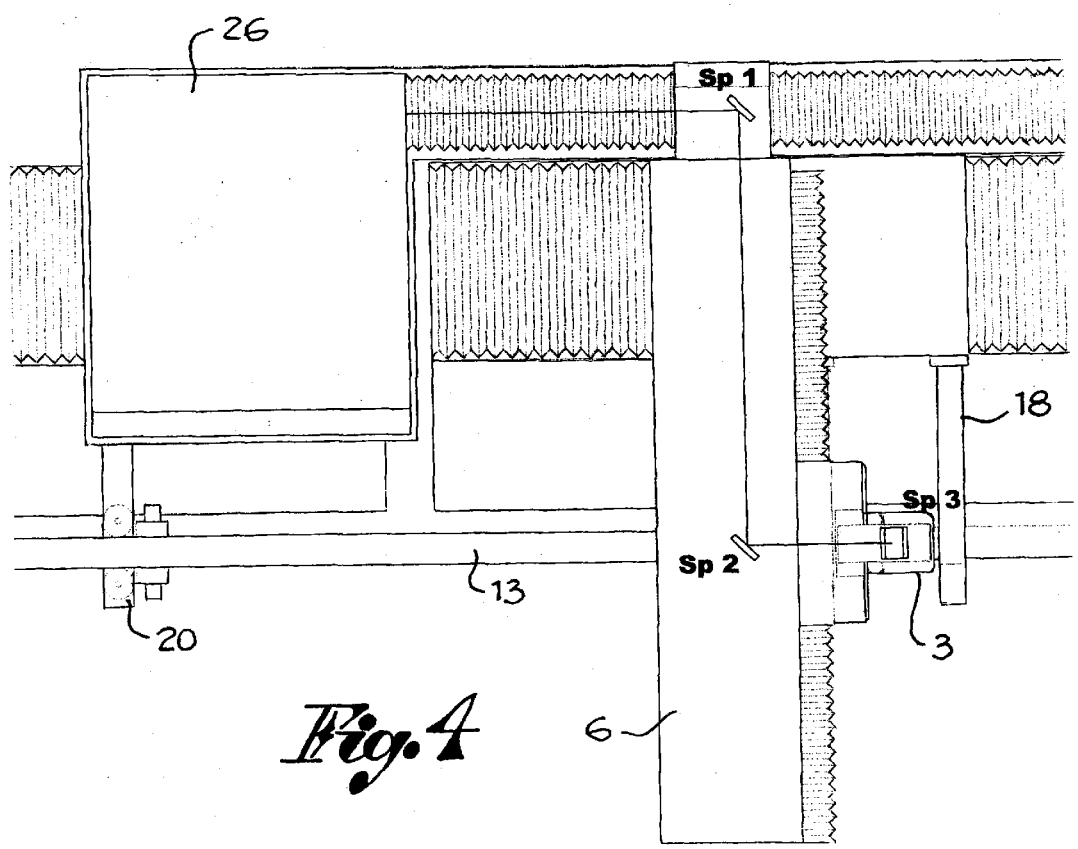
FIG. 4 represents a view from above of the layout of the laser beam reflection mirrors.

As shown in FIG. 2, said arm 3 is susceptible to rotation on bearing ring 4 and to movement on rail 6 so as to enable head 7, representing the means for focalising the laser, to always be positioned with its longitudinal axis at right angles with respect to the pipe to be cut, thus making it possible to cut pipes of various diameters and different cross sections, meaning not only round in shape.

Said head 7 also features a mirror Sp5 for reflecting the laser beam from a source 26 and suitably deviated as far as said head 7 by numerous reflection and deviation mirrors Sp1, Sp2, Sp3 and Sp4.

In a second form of realisation shown in FIGS. 6–10, the machine in question comprises, inside cab 1, a first guide rail 27 parallel with the direction of feed of pipes 13 exiting from the machining line, and a carriage 27 susceptible to movement along said first guide rail 27. Said carriage 28 bears, fastened to one end, a system of retention grippers 29 and pipe guides 13. On the top, carriage 28 also bears a second guide rail 30 at right angles to the first. Along such second rail a third guide rail 31 is located for movement, inclined at an angle α with respect to the second, facing towards the pipe 13 and lying at a right angle to the first rail 27. If necessary, the angle α can be equal to 90°, meaning the third rail 31 can also be perpendicular with respect to the second 30.

Along said third guide rail 31, a carriage 32 moves on which is fitted a bearing ring 33.

On bearing ring 33 is hinged an arm 34 bearing on its free end a rotating cutting head 7.

FIGS. 9 and 10 show the optical path of the laser beam coming from source 26; thanks to a suitable system of mirrors Sp1'-Sp6', the beam reaches the cutting head 7 from where it is focalised on the surface of pipe 13 by means of a relevant mirror Sp7'.

As can be seen from the broken lines in FIG. 7, the movement of the third guide rail 31 on the second rail 30, the movement of carriage 32 and the rotation of arm 34, produced by the respective electric motors controlled by control unit 25, enable head 7 to direct the laser beam in this case as well always at right angles with respect to the pipe 13, thereby making it possible to cut pipes of various diameters and cross sections, meaning not only round.

In this second form of realisation, the machine is more compact and is therefore preferable in the event of its being necessary to reduce overall dimensions to the utmost or having to cut very large-diameter pipes.

In the case of both machines described, outside and downstream of cabin 1, the pipe 13, exiting from opening 12, is further guided by rollers 20 until it enters an extraction unit 21 for the fumes produced by laser cutting and movable on a rail 22, said unit 21 featuring a front opening 23 for pipe entry and another rear opening 24 for exit and removing pipe 13 after cutting.

According to the invention in question, at the start of the machining cycle, pipe 13, coming from a production line, enters cab 1 through opening 11 and is intercepted by the radial grippers 14 or 29 before exiting, through opening 12, until it fits into the fume extraction unit 21.

During this phase, the structure bearing the cutting head 7 and the grippers 14 or 29 are synchronised so as to move at the same speed as pipe 13 and permit grip by means of grippers 14 or 29 and cutting by means of the head 7 according to the previously-described procedure.

It should be noted that, without ever going outside the scope of the invention, the machine in question can also be used for cutting precut pipe sections.

What is claimed is:

1. Machine for cutting pipes with different cross-sections and different diameters by means of laser beam, comprising a laser source (26) and a system of mirrors for directing the laser beam from said source to a cutting head (7) for focalising said beam on a pipe to be cut through a relevant mirror (Sp5, Sp7') characterised by the fact that said cutting head is fitted rotating on an arm (3, 34) hinged on a bearing ring (5, 33) said bearing ring being on board a carriage (4, 32) sliding on a system of guide rails that can move parallel to the pipe to be cut, the rotation of the cutting head and of the arm and the movements of the carriage and guide rail system being coordinated by a control unit (25) in such a way that the cutting head always aims the laser beam at right angles with respect to the surface of the pipe to be cut.

2. Machine as in claim 1, in which the system of guide rails comprises at least a first rail (17, 27) parallel to the pipe to be cut, on said rail being susceptible to movement a carriage (16, 28) carrying on the one side a system of retention grippers (14, 29) and guide for the pipe to be cut.

3. Machine as in claim 1, in which the system of guide rails also comprises a second rail (8) parallel to the first on which is susceptible to movement a third rail (6) at right angles to the first two, on said third rail being susceptible to movement the carriage (5) carrying the bearing ring (4).

4. Machine as in claim 3, in which the arm (3) carrying the cutting head is telescopic.

5. Machine as in claim 1 which the carriage (28) bears a second guide rail (30) at right angles to the first, on which second rail is susceptible to movement a third guide rail (31) tilted at an angle (α) with respect to the second and lying at right angles to the first guide rail (27), on said third guide rail being susceptible to movement the carriage (32) carrying the bearing ring (33).

6. Machine as in claim 5, in which said angle (α) is equal to 90°.

7. Machine as in claim 1, characterized by the fact that it features an extraction unit (21) for the films produced by the pipe cutting operation, said unit being intended to receive the end of the pipe downstream of arm (3, 34) and being susceptible to movement along a rail (22) parallel to said pipe.

8. Machine as in claim 2, in which the system of guide rails also comprises a second rail (8) parallel to the fist on which is susceptible to movement a third rail (6), at right angles to the first two, on said third rail being susceptible to movement the carriage (5) carrying the bearing ring (4).

9. Machine as in claim 2 which the carriage (28) bears a second guide rail (30) at right angles to the first, on which second rail is susceptible to movement a third guide rail (31) tilted at an angle (α) with respect to the second and lying at right angles to the first guide rial (27), on said third guide rail being susceptible to movement the carriage (32) carrying the bearing ring (33).

10. Machine as in claim 2, characterized by the fact that it features an extraction unit (21) for the fumes produced by the pipe cutting operation, said unit being intended to receive the end of the pipe downstream of arm (3, 34) and being susceptible to movement along a rail (22) parallel to said pipe.

11. Machine as in claim 3, characterized by the fact that it features an extraction unit (21) for the fumes produced by the pipe cutting operation, said unit being intended to receive the end of the pipe downstream of arm (3, 34) and being susceptible to movement along a rail (22) parallel to said pipe.

12. Machine as in claim 4, characterized by the fact that it features an extraction unit (21) for the fumes produced by the pipe cutting operation, said unit being intended to receive the end of the pipe downstream of arm (3, 34) and being susceptible to movement along a rail (22) parallel to said pipe.

13. Machine as in claim 5, characterized by the fact that it features an extraction unit (21) for the fumes produced by the pipe cutting operation, said unit being intended to receive the end of the pipe downstream of arm (3, 34) and being susceptible to movement along a rail (22) parallel to said pipe.

14. Machine as in claim 6, characterized by the fact that it features an extraction unit (21) for the fumes produced by the pipe cutting operation, said unit being intended to receive the end of the pipe downstream of arm (3, 34) and being susceptible to movement along a rail (22) parallel to said pipe.

* * * * *